US012632155B2

(12) United States Patent
Zhu

(10) Patent No.: US 12,632,155 B2
(45) Date of Patent: May 19, 2026

(54) EDITING TECHNIQUES FOR INTERACTIVE VIDEOS

(71) Applicant: Microsoft Technology Licensing, LLC, Redmond, WA (US)

(72) Inventor: Xuelei Zhu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 17/345,941

(22) Filed: Jun. 11, 2021

(65) Prior Publication Data

US 2022/0398002 A1      Dec. 15, 2022

(51) Int. Cl.
| | |
|---|---|
| *G06F 3/04815* | (2022.01) |
| *A63F 13/86* | (2014.01) |
| *G06F 3/0482* | (2013.01) |
| *G06F 3/04847* | (2022.01) |
| *G11B 27/031* | (2006.01) |

(52) U.S. Cl.
CPC .......... *G06F 3/04815* (2013.01); *A63F 13/86* (2014.09); *G06F 3/04847* (2013.01); *G11B 27/031* (2013.01); *G06F 3/0482* (2013.01)

(58) Field of Classification Search
CPC ............. G06F 3/04815; G06F 3/04847; G06F 3/0482; A63F 13/86; G11B 27/031
See application file for complete search history.

(56) References Cited

U.S. PATENT DOCUMENTS

| | | | | |
|---|---|---|---|---|
| 8,564,595 | B1 * | 10/2013 | Ho | G06T 15/20 |
| | | | | 345/426 |
| 11,250,617 | B1 * | 2/2022 | Sempe | G06F 3/012 |
| 2015/0258430 | A1 * | 9/2015 | Alexeev | A63F 13/2145 |
| | | | | 463/36 |
| 2019/0083885 | A1 * | 3/2019 | Yee | G06F 3/04815 |
| 2020/0145635 | A1 * | 5/2020 | Yoneda | G06F 3/011 |

OTHER PUBLICATIONS

FXhome, "How to light a 3D model", Mar. 8, 2016, youtube.com, https://www.youtube.com/watch?v=7GQeLSY-TnY, pp. 1-38 (Year: 2016).*

* cited by examiner

*Primary Examiner* — Daniel W Parcher
(74) *Attorney, Agent, or Firm* — Ray Quinney & Nebeker P.C.; John O. Carpenter

(57)      ABSTRACT

Techniques for editing an interactive video, such as a video game, are disclosed. A three-dimensional (3D) view of the interactive video (e.g., a level in a video game) is presented, enabling one or more nodes in the interactive video to be edited. Example nodes include, but are not limited to, a camera node, a visual effects node, and an audio effects node. The 3D view of also enables a path that is logically connected to two nodes to be edited. For example, the path represents a camera transition when the path is logically connected to two camera nodes.

19 Claims, 16 Drawing Sheets

104

214

212

104

214

104

214

204

RECEIVE INDICATION TO EDIT
INTERACTIVE VIDEO     500

DISPLAY LEVEL OR CAUSE LEVEL
TO BE DISPLAYED     502

RECEIVE SELECTION OF
NODE     504

RECEIVE ONE OR MORE
EDITS TO NODE     506

RECEIVE INDICATION TO ADD OR
DELETE A NODE     508

RECEIVE SELECTION OF
GRAPHICAL ELEMENT     510

RECEIVE EDITS TO PATH     512

RECEIVE EDITS TO LOGIC OF
A NODE     514

VIEW MODIFIED LEVEL     516

RECEIVE INDICATION TO EDIT
INTERACTIVE VIDEO     500

DISPLAY LEVEL OR CAUSE LEVEL
TO BE DISPLAYED     502

RECEIVE INDICATION TO
ADD NODE     508

POSITION NODE IN
THE LEVEL     1100

RECEIVE NODE TYPE     1102

RECEIVE NODE SETTINGS AND/OR
LOGIC     1104

VIEW MODIFIED LEVEL     516

EDITING TECHNIQUES FOR INTERACTIVE VIDEOS

BACKGROUND

Advancements in interactive videos and other multimedia content, such as video games, have produced more immersive and dynamic interactive videos. Such interactive videos can include high quality cinematography and seamless transitions between the scenes or levels in an interactive video and between the interactive video and the cutscenes. However, these types of interactive videos typically require intensive scripting or programming instructions. Additionally, editing the interactive video (or the scripting of the interactive video) can require extensive technical knowledge. The edits may also require time consuming review cycles to ensure the interactive video performs as expected in response to the edits.

SUMMARY

Techniques for editing an interactive video and other multimedia content, such as a video game, are disclosed. A three-dimensional (3D) view of the interactive video (e.g., a level in a video game, a scene in a movie, an environment in an image or video) is presented, enabling one or more nodes in the interactive video to be edited. Example nodes include, but are not limited to, a camera node, a visual effects node, and an audio effects node. The 3D view also enables a path that is logically connected to two nodes to be edited. For example, the path represents a camera transition between two or more points of interest when the path is logically connected to two camera nodes.

In one aspect, a method includes receiving an indication to edit an interactive video, where the interactive video includes content, and causing a 3D view of the interactive video to be displayed. The 3D view displays a node in the interactive video. A selection of the node is received, and information associated with the node is caused to be displayed. An edit to the information is received to produce an edited node. The edited node changes a portion of the content of the interactive video when the interactive video is viewed.

In another aspect, a system includes a processing device and a storage device operably connected to the processing device. The storage device stores instructions, that when executed by the processing device, cause operations to be performed. The operations include receiving an indication to edit an interactive video, where the interactive video includes content, and causing a 3D view of the interactive video to be displayed in a first graphical user interface (GUI). The 3D view displays a node and a path logically connected to the node. A selection of the node is received via the first GUI. Information associated with the node is caused to be displayed in the first GUI or in a separate second GUI. An edit to the information is received via the first GUI or the second GUI to produce an edited node. The edited node changes a portion of the content of the interactive video when the interactive video is viewed.

In yet another aspect, a method includes receiving an indication to edit an interactive video and causing a three-dimensional (3D) view of the interactive video to be displayed in a first graphical user interface (GUI). The 3D view displays a first camera node, a second camera node, a path between the first and the second camera nodes that represents a camera transition between the first and the second camera nodes, and a graphical element that is associated with the path. A selection of the graphical element is received via the first GUI. Information associated with the path is caused to be displayed in the first GUI or in a separate second GUI. An edit to the information is received via the first GUI or the second GUI to produce an edited path. The edited path modifies the camera transition between the first and the second camera nodes to alter which content in the interactive video is viewed during the camera transition.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

Figure 1:
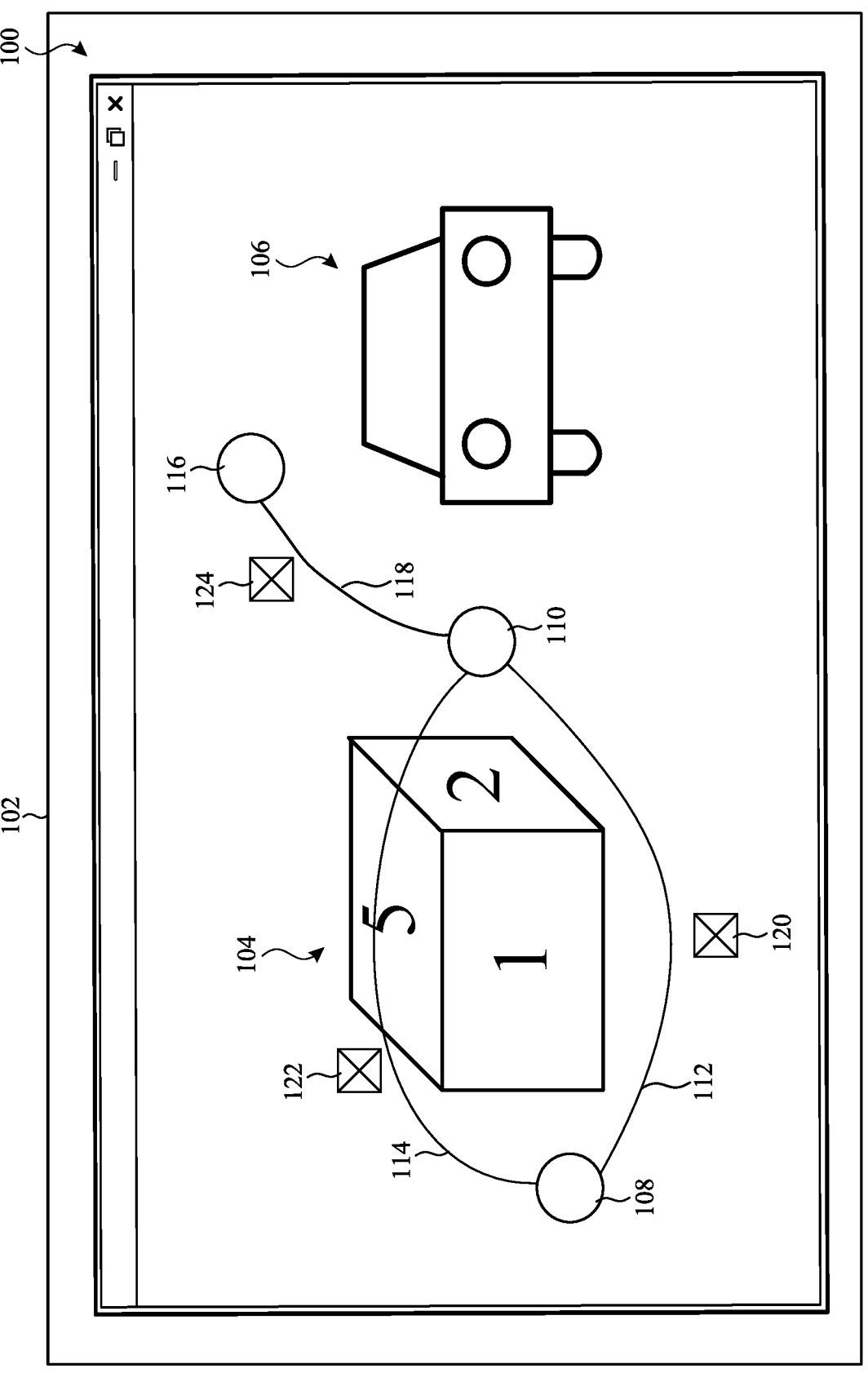
FIG. 1 illustrates an example GUI that enables interaction with one or more nodes in an interactive video in accordance with some embodiments.

In the following detailed description, references are made to the accompanying drawings that form a part hereof, and in which are shown by way of illustrations, specific embodiments, or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is, therefore, not to be taken in a limiting sense, and the scope of the present disclosure is defined by the appended claims and their equivalents.

Generally, embodiments disclosed herein provide techniques for editing an interactive video. As used herein, an interactive video is two-dimensional (2D) or three-dimensional (3D) multimedia content, such as a video, that enables a user to interact with the content in the multimedia content through a variety of tools. For example, a user can move around the content in the interactive video, act on objects in the interactive video (e.g., pick up an object, stand on an object, move an object), achieve objectives or goals, and the like. Interactive videos have a variety of applications, including, but not limited to, entertainment, learning and development, and sales and marketing. Examples of an interactive video include, but are not limited to, a video game, a movie or video, software application content, broadcast or streaming content, a simulated environment (e.g., virtual reality, augmented reality, and mixed reality environments), an animation, and a set of images. Embodiments disclosed herein are described in conjunction with a video game, but other embodiments are not limited to this type of interactive video. The present invention can be implemented in or used with other types of interactive videos.

A video game is typically arranged in levels. Users of a video game can click, drag, scroll, hover, and complete other types of actions to interact with the objects in each level of the video game. As used herein, the phrase "player user" refers to a user that plays and interacts with a video game. The player user can move through and around the content in the video game directly (e.g., first person perspective) or through a graphical representation (e.g., an avatar) of the player user or a graphical representation of a character (e.g., third person perspective).

As a player user moves around a level in a video game, different actions or events may happen, or new or changed features may be presented to the player user. For example, when a player user walks toward a point of interest (hereinafter "object"), an action or a cutscene may be triggered. Generally, a cutscene is a non-interactive sequence that advances a plot or progression of a video game, introduces new characters, provides background information, offers further development of a character, illustrates objectives to be completed, provides different perspectives of an object, and the like. An action can be any suitable action, such as visual effects and/or audio effects.

In some embodiments, the beginning point and the ending point of a cutscene or an action are represented as nodes that are created and edited in an editing software application. Additionally, the locations in a level that can trigger an action can be represented as nodes. The nodes can represent camera views and transitions, visual effects, audio effects, both visual and audio effects, and other actions or effects that have a spatial relationship with one or more objects in the level. As will be described in more detail later, techniques for creating, deleting, and editing one or more nodes and/or one or more paths between nodes for one or more cutscenes and/or one or more levels in a video game are disclosed.

Technical advantages to the example embodiments include increased ease in creating and editing nodes and paths in an interactive environment, such as a level in a video game. Each node and each path can be placed directly into the interactive video. Additionally or alternatively, the embodiments make is easier to visualize and understand the layout of the nodes and the paths in the interactive video. Embodiments show the spatial relationships of the nodes to each other, the spatial relationships of the paths to the nodes, and the spatial relationships of the nodes and the paths to one or more objects in interactive video. In some aspects, a node graph in a 3D format can be directly embedded in a editing software application. In the non-limiting nonexclusive example of a video game, a node graph in a 3D format can be directly embedded in a level editor for gameplay camera editing.

FIG. 1 illustrates an example GUI that enables interaction with one or more nodes in an interactive video in accordance with some embodiments. The graphical user interface 100 is displayed on a display screen 102 of a display device. In one embodiment, the GUI is part of an editing software application for video games, such as a node editing software application. The illustrated GUI 100 presents a level (or a part of the level) in the video game.

The level presented in the GUI 100 includes two objects, a block 104 with numbers on the sides and an automobile 106. A node 108 is positioned at one side of the block 104 and a node 110 is positioned on another side of the block 104. A path 112 logically connects the node 108 to the node 110. A path 114 logically connects the node 108 to the node 110. When the node 108 or the node 110 is triggered, the progression of the video game can advance along the path 112 or the path 114 based on one or more factors associated with the level and/or with the player user. For example, the path 112 is selected when the player user has a score that is below a threshold score and can move along the path 114 when the score is above the threshold score. Additionally or alternatively, the path 112 is selected when the level in the video game is above a threshold level and/or the player user has collected certain treasures, weapons, or tools. The path 114 is selected when the level is below the threshold level and/or the player user has collected other types of treasures, weapons, or tools. Aspects such as the location of the player user in the level can also be used to determine which path 112, 114 is traversed when the node 108 or the node 110 is triggered.

Additionally, a node 116 is positioned along a side of the automobile 106, and a path 118 logically connects the node 110 to the node 116. Generally, the nodes 108, 110, 116 and the paths 112, 114, 118 are not visible to a player user when the player user plays the video game, but become visible when the level is viewed in an editing software application.

In one embodiment, the nodes 108, 110, 116 are "objects" that can be selected (e.g., clicked on), moved or dragged in one or more directions (e.g., x, y, and z directions), rotated, copied, and/or may be associated with a presentable contextual menu that provides additional functionality. For example, a contextual menu may be displayed by right-clicking on a node 108, 110, 116. Additionally or alternatively, the paths 112, 114, 118 are "objects" that can be selected, moved in one or more directions to link to a different node or to change the transition path, copied, and/or that may be associated with a contextual menu that provides additional functionality.

The GUI 100 can further include graphical elements 120, 122, 124. Selection of a graphical element 120, 122, 124 enables a user to edit one or more settings that are associated with a respective path 112, 114, 118 and/or a node 108, 110, 116. As used herein, the term "editor user" refers to a user that creates and/or edits a video game, including the paths and the nodes of the levels in the video game.

In the illustrated embodiment, the nodes 108, 110, 116 are camera nodes and each path 112, 114, 118 represents the transition or movement of a camera between respective nodes 108, 110, 116. In a non-limiting, nonexclusive example, the paths 112, 114, 118 are implemented as splines, which are curves or lines that run through a series of given points. Selection of a graphical element 120, 122, 124 enables the editor user to edit one or more settings for the spline associated with the selected graphical element 120, 122, 124. Additionally or alternatively, selection of a graphical element 120, 122, 124 enables the editor user to edit one or more settings of one or more nodes 108, 110, 116.

The GUI 100 illustrates several advantages to the embodiments disclosed herein. The nodes 108, 110, 116 and/or the paths 112, 114, 118 are displayed in a 3D view that shows the spatial relationships of the nodes 108, 110, 116 to each other, the spatial relationships of the paths 112, 114, 118 to the nodes 108, 110, 116, and the spatial relationships of the nodes 108, 110, 116 and the paths 112, 114, 118 to one or more objects in the level of a video game. When the nodes 108, 110, 116 are configured as camera nodes, each path 112, 114, 118 depicts the movement or transition of a camera as the camera traverses a respective path. The 3D view can make it easier to understand the layout of the nodes 108, 110, 116 and the paths 112, 114, 118 in the level. Additionally or alternatively, the 3D view may reduce the amount of time needed for review cycles when editing a level, in part because the 3D view presents the spatial relationships of the nodes 108, 110, 116 to each other, the lengths, the directions, and the transitions of the paths 112, 114, 118, and the spatial relationships of the nodes 108, 110, 116 and the paths 112, 114, 118 to one or more objects in the level. Also, any changes to the length, the direction, and the node connections of a path 112, 114, 118 can be presented in the 3D view immediately.

Figure 2:
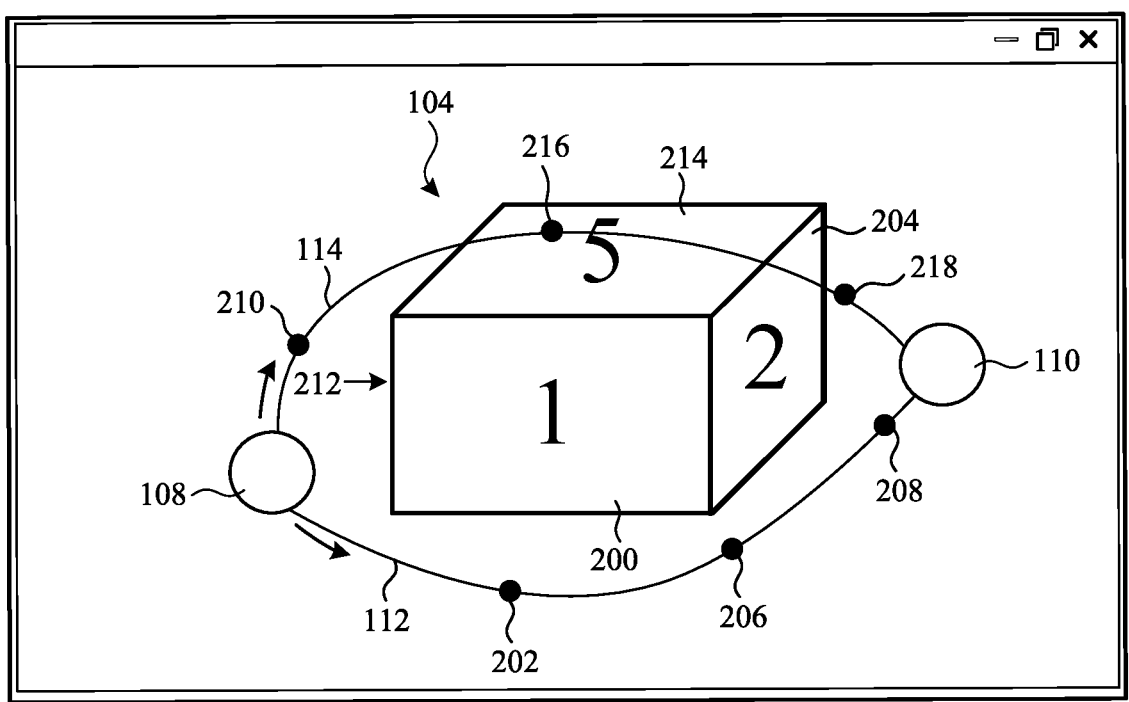
FIG. 2 illustrates an example GUI that displays the paths between two camera nodes in accordance with some embodiments.

FIG. 2 depicts an example GUI that displays the paths between two camera nodes in accordance with some embodiments. As discussed previously, the node 108 is positioned on one side 200 of the block 104 and the node 110 is positioned on another side 204 of the block 104. The path 112 logically connects the node 108 the node 110. A player user can trigger the action or feature associated with a node as the player user moves around a level, performs an action, interacts with objects in the level of the video game. These triggering conditions are only examples and other triggering conditions can be used to trigger a node. In one embodiment, the player user triggers a node when the player user moves within a given distance of the node.

As discussed earlier, the nodes 108, 110 are camera nodes and each path 112, 114 shows the transitions of a camera between the nodes 108, 110. In FIG. 2, when the triggering condition of the node 108 is met (e.g., the player user is within a given distance to the node 108), the camera can move along one of the two paths 112, 114. Which path is selected may be based on one or more factors associated with the level and/or with the player user. For example, the camera may move along the path 112 when the player user has a score that is below a threshold score and can move along the path 114 when the score is above the threshold score. Additionally or alternatively, the camera may move along the path 112 when the level in the video game is above a threshold level and/or the player user has collected certain treasures, weapons, or tools. The camera can move along the path 114 when the level is below the threshold level and/or the player user has collected other types of treasures, weapons, or tools. Aspects such as the location of the player user in the level can also be used to determine which path 112, 114 is traversed when the node 108 is triggered.

Figure 3A:
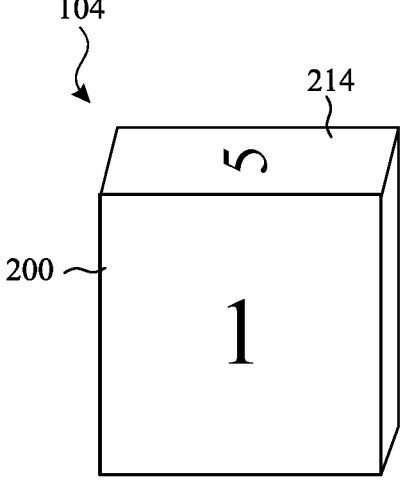
FIGS. 3A-3C illustrate the views along a path shown in FIG. 2 in accordance with some embodiments.
Figures 3B, 3C:
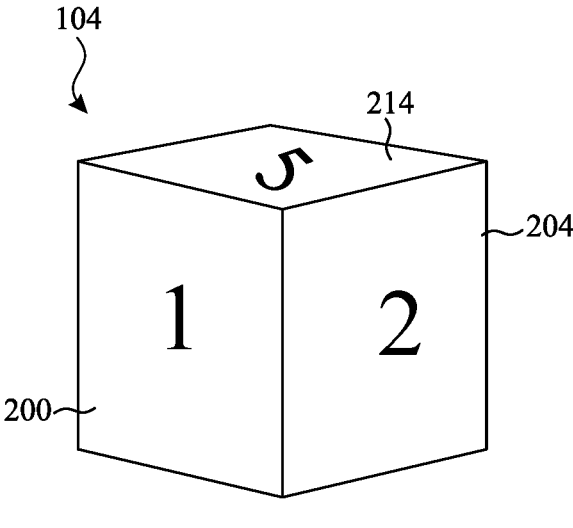

The path 112 shown in FIG. 2 is described in conjunction with FIGS. 3A-3C, where FIGS. 3A-3C illustrate the transitions along the path in accordance with some embodiments. As the camera moves along the path 112 from the node 108 to the node 110, the camera reaches the point 202 and the player user is shown the side 200 of the block 104 that depicts the number "1" and the side 214 that presents the number "5". This view is shown in FIG. 3A. As the camera continues to move along the path 112, the player user views the sides 200 and 214 and the side 204 of the block 104 that depicts the number "2" at point 206. This view is shown in FIG. 3B. When the camera reaches point 208, the player user views the sides 204 and 214. This view is shown in FIG. 3C.

Figure 4A:
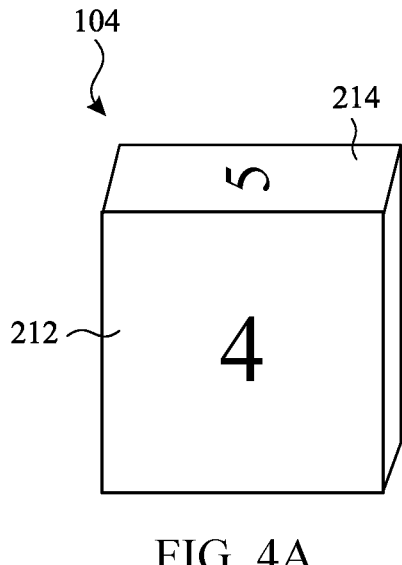
FIGS. 4A-4C illustrate the views along an alternative path shown in FIG. 2 in accordance with some embodiments.
Figure 4B:
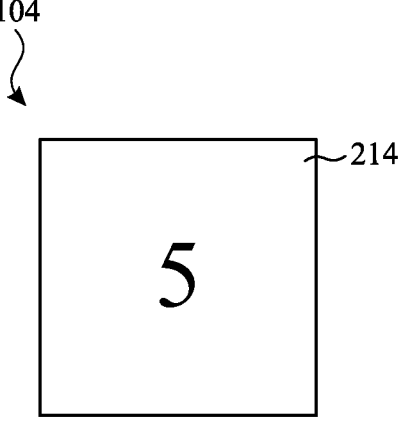
Figure 4C:
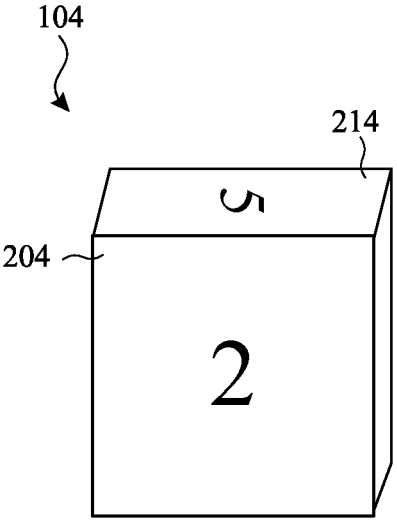

The path 114 shown in FIG. 2 is described in conjunction with FIGS. 4A-4C, where FIGS. 4A-4C illustrate the transitions along the path in accordance with some embodiments. As the camera moves along the path 114 from the node 108 to the node 110, the player user views both the side 212 of the block 104 that presents the number "4" and the side 214 that depicts the number "5" at point 210. This view is shown in FIG. 4A. As the camera continues to move along the path 114, the player user views the side 214 that depicts the number "5" at point 216. This view is shown in FIG. 4B. When the camera reaches point 218 on the path 114, the player user views the side 214 and the side 204 that depicts the number "2". This view is shown in FIG. 4C.

Techniques for editing the nodes 108, 110 and the paths 112, 114 are described herein. For example, the paths 112, 114 may be edited to provide different transitions between the nodes 108, 110. In one embodiment, the paths 112, 114 are implemented as splines. One or more settings for a spline can be changed to adjust the shape of the spline to change the camera transitions between the nodes 108, 110, which in turn changes the content in the video game that the player user experiences.

Figure 5:
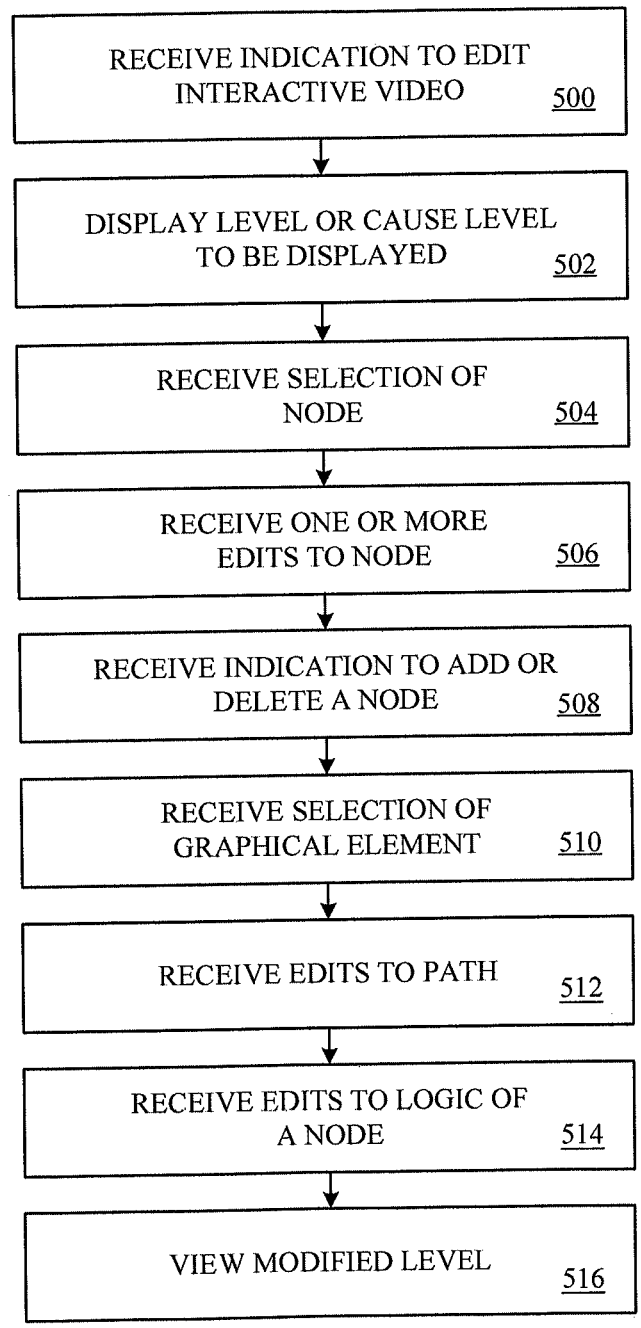
FIG. 5 illustrates a flowchart of an example method of interacting with a node and/or a path in an interactive video in accordance with some embodiments.

FIG. 5 illustrates a flowchart of an example method of interacting with a node and/or a path in an interactive video in accordance with some embodiments. The process is performed by an editor user to add, delete, or modify one or more nodes and/or one or more paths in a level of a video game. The method is described in conjunction with interacting with one node and one path, but can be used to edit, delete, or add multiple nodes and/or paths. For example, blocks 504, 506, 508, and 516 can repeat for each node to be edited. The process may then perform blocks 510, 512, 514, 516 for each path to be processed. Alternatively, when only a node or nodes are to be processed, the method ends after blocks 504, 506, 508, and 516 are performed for each node to be processed. Similarly, when only a path or paths are to be processed, the method ends after blocks 510, 512, 514, 516 are performed for each path to be processed.

Initially, an indication to edit a video game is received at block 500. In a non-limiting nonexclusive example, the indication is the launching of an editing software application or the editing software application entering an editing mode. Next, as shown in block 502, a level of a video game is displayed, or caused to be displayed, in a 3D view. The 3D view includes one or more nodes and one or more paths, where at least one node or at least one path is to be edited. For example, 3D view of the level is presented in a GUI as shown in FIG. 1.

Next, as shown in block 504, a selection of a node is received. One or more edits to the selected node are received at block 506. In one embodiment, an editor user can click on a node to select the node. In another embodiment, an editor user can enter or otherwise specify a node name/identifier to select the node. In response to the selection, a panel is displayed that presents various settings of the node.

Figure 6:
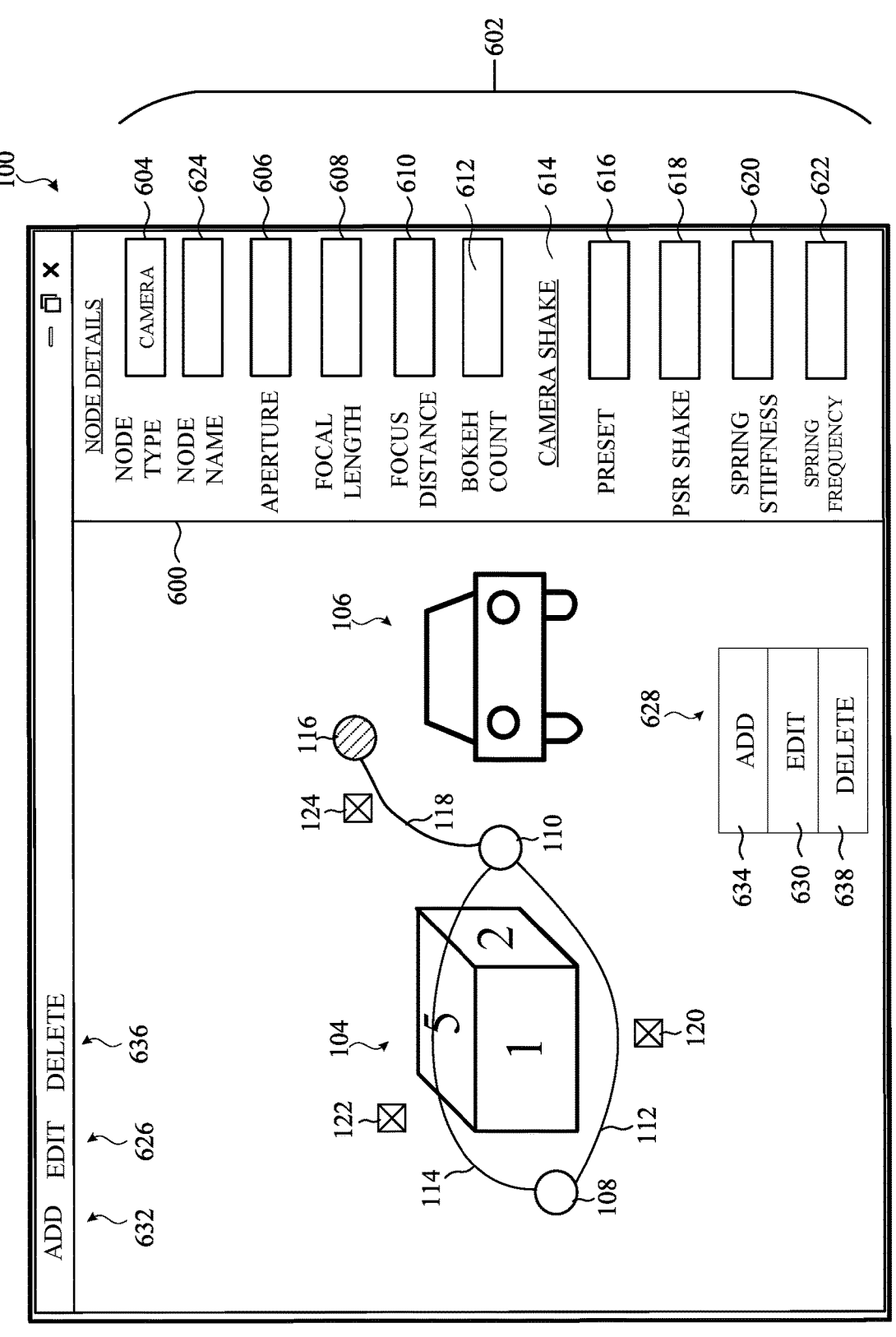
FIG. 6 illustrates an example GUI that enables a camera node to be edited in accordance with some embodiments.

FIG. 6 illustrates an example GUI that enables a camera node to be edited in accordance with some embodiments. The node 116 has been selected, as indicated by the hash lines within the node 116. In response to the selection of the node 116, a panel 600 is presented in the GUI 100. In other embodiments, the panel is displayed in a second GUI that is separate from the GUI 100.

The panel 600 includes settings 602 for the selected node 116. An editor user can enter or change a value of one or more settings of the node 116 using the panel 600. As noted earlier, the example node 116 is a camera node, as specified in the node type input element 604. Thus, the settings 602 include settings that are associated with a camera, such as an aperture input element 606, a focal length input element 608, a focus distance input element 610, and a bokeh count input element 612. In the illustrated embodiment, the settings further include settings for camera shake 614, such as a preset input element 616, a pixel shift resolution (PSR) shake input element 618, a spring stiffness input element 620, and a spring frequency input element 622. The settings 602 also include a node name input element 624. Each input element 604, 606, 608, 610, 614, 616, 618, 620, 622, 624 can be implemented as any suitable type of an input element. Example input elements include, but are not limited to, text entry boxes, drop-down menus, list boxes, toggles, and sliders. In other embodiments, the settings 602 can include additional camera settings, fewer camera settings, and/or different types of camera settings.

In another embodiment, the GUI 100 can include a menu option 626 to edit a node. Additionally or alternatively, the editor user may right-click on the GUI 100 to cause a contextual menu 628 to be displayed. The contextual menu 628 may include an option 630 to edit a node. In some embodiments, an editor user can select (e.g., right-click on) a node (e.g., node 116) and select an edit option from a contextual menu associated with the node. For example, the contextual menu 628 may be presented in response to the editor user selecting (e.g., right-clicking) the node 116.

Returning to FIG. 5, an indication to add or to delete a node is received at block 508. The node is then deleted or added in response to receiving the indication to delete or add the node. A node can be added using one of several methods. In one example, the GUI 100 shown in FIG. 6 can include a menu option 632 to add a node. In another example, an editor user may right-click on the GUI to cause the contextual menu 628 to be displayed. The contextual menu 628 can include an option 634 to add a node. In one embodiment, the panel 600 shown in FIG. 6 is displayed when an editor user adds a node to enable the editor user to specify settings for the node. The panel 600 may be displayed automatically in response to the addition of a node, or the panel 600 can be presented in response to the editor user selecting the newly added node.

Similarly, the GUI 100 can include a menu option 636 to delete a node and/or the contextual menu 628 may include an option 638 to delete a node. In some embodiments, an editor user can select (e.g., right-click on) a node and select a delete option from a contextual menu associated with the node. For example, the contextual menu 628 may be presented in response to the editor user selecting a node.

Figure 7:
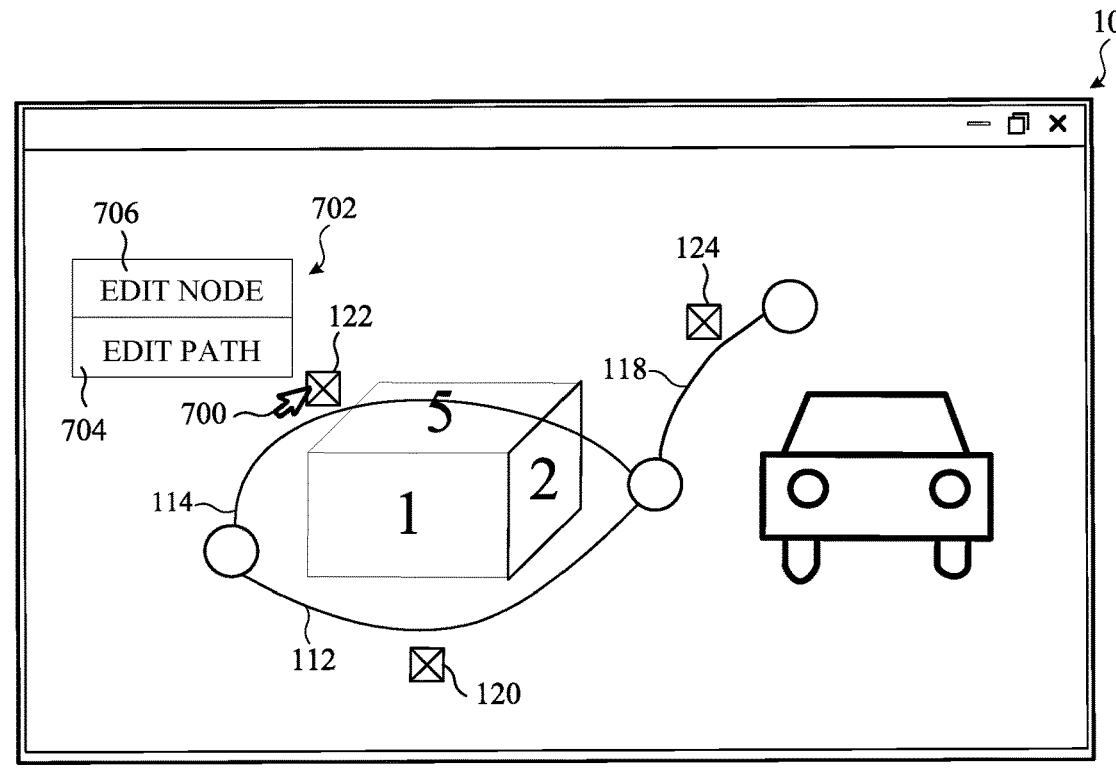
FIG. 7 illustrates an example GUI that enables interaction with a graphical element to edit one or more settings of a path and/or a node in accordance with some embodiments.

Next, as shown in block 510, a selection of a graphical element (e.g., graphical element 120, 122, 124 in FIG. 1) is received. In one embodiment, a contextual menu is presented in response to the selection of the graphical element. The contextual menu provides an option for editing one or more settings of a path and/or a node. FIG. 7 illustrates an example GUI that enables interaction with a graphical element to edit one or more settings of a path and/or a node in accordance with some embodiments. In one embodiment, the graphical elements 120, 122, 124 are associated with corresponding paths 112, 114, 118. The graphical elements 120, 122, 124 can be selected via a touch input or by selecting (e.g., clicking on) the graphical element 120, 122, 124. In the illustrated embodiment, a cursor 700 is positioned over the graphical element 122 and the editor user controlling the cursor 700 clicks on the graphical element 122. In response to the click, the contextual menu 702 is presented in the GUI 100. The contextual menu 702 includes an option 704 to edit a path associated with the selected graphical element (e.g., graphical element 122 and the path 114) and an option 706 to edit one or more nodes.

Figure 8:
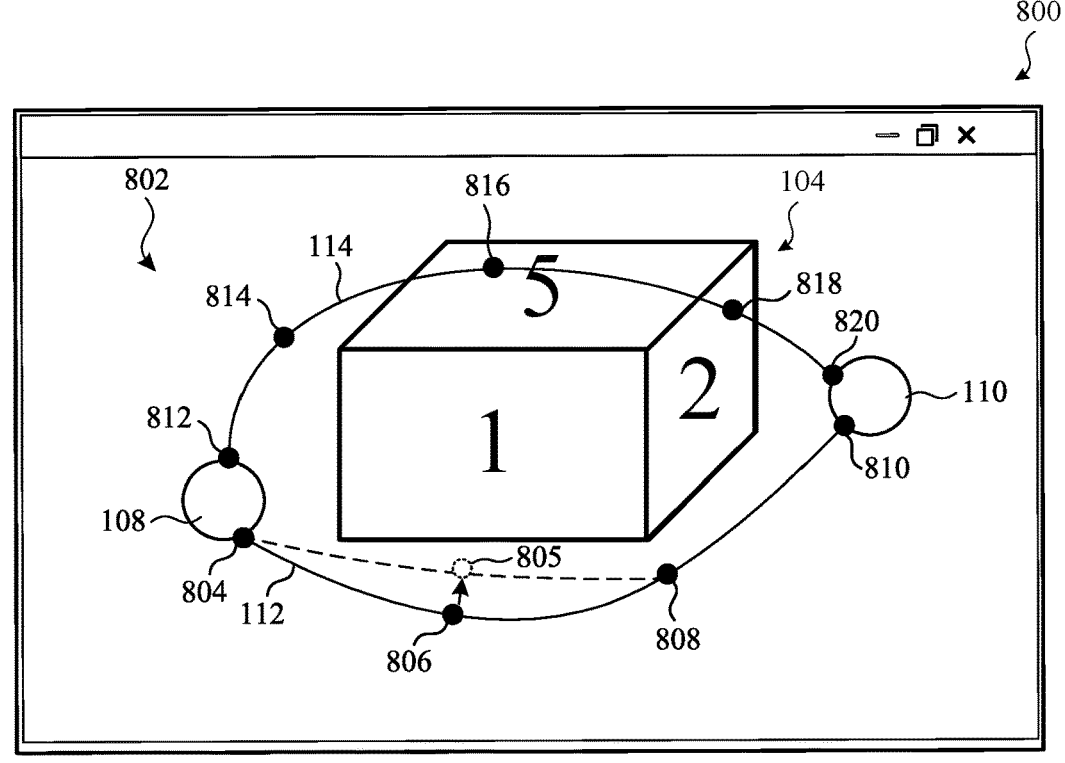
FIG. 8 illustrates an example GUI that enables a path to be edited in accordance with some embodiments.

At block 512, edits to one or more settings for a path is received. In FIG. 7, the option 704 is selected to edit one or more settings for a path. FIG. 8 illustrates an example GUI that enables a path to be edited in accordance with some embodiments. In one embodiment, each path is a spline and the spline is modified using a spline editor 802. The path 112 includes control vertices 804, 806, 808, 810 and the path 114 includes control vertices 812, 814, 816, 818, 820. Each path 112, 114 can include a different number of control vertices in other embodiments.

Each control vertex 804, 806, 808, 810, 812, 814, 816, 818, 820 can be repositioned in a 3D space (e.g., x, y, z directions). In the illustrated embodiment, the control vertex 806 is dragged to point 805, which changes the length and the shape of the path 112. Based on moving the control vertex 806 to point 805, the view of the block 104 changes as the camera traverses the path 112. For example, instead of seeing the sides 200 and 214 in FIG. 3A, only the side 200 is viewed at point 805.

Moving one or more of the control vertices 804, 806, 808, 810, 812, 814, 816, 818, 820 changes the length and the shape of the path(s) 112, 114. Additionally, the control vertices 804, 812 that logically connect to the node 108 and the control vertices 810, 820 that logically connect to the node 110 can each be moved to a different node (not shown) to change the starting or ending point of the path 112, 114. The spline editor 802 depicts non-limiting nonexclusive editing tools. Other spline editors can enable an editor user to edit a path with different or additional editing tools.

Referring again to FIG. 5, one or more edits to the logic of a node is received at block 514. The logic of a node is typically implemented as programming instructions that may define the triggering condition(s) for the node and what action(s) or feature(s) is to execute in response to the triggering of the node. The editor user can add or edit the programming instructions associated with the action(s) or feature(s) of a node and/or add or edit the triggering condition(s) that are to be met in order for the action(s) or feature(s) of the node to execute. As described earlier, example conditions that trigger a node include, but are not limited to, the location of a player user with respect to an object, an action that is performed by the player user, and/or the player user interaction(s) with objects in a level of the video game. In FIG. 7, when the option 706 to edit one or more nodes is selected, an editor user is able to edit the logic associated with one or more nodes.

The editor user can view the changes to a level in the video game at block 516 to preview or view the edits to the node(s) and/or path(s) performed in blocks 504, 506, 510, 512. In one embodiment, the changes to the level are displayed in a window or panel in the GUI (e.g., in GUI 100 in FIG. 1). In other embodiments, the changes to the level are presented in a separate GUI that is displayed concurrently with the GUI used to edit the node and/or the path (e.g., GUI 1010 in FIG. 10), or the separate GUI is presented by itself. In still another embodiment, the editor user can launch the video game and view the changes to the level by viewing the level as it plays. In such an embodiment, the editor user may move around the level, interact with objects, and the like. This allows the editor user to experience the level as a player user would experience the level.

Figure 9:
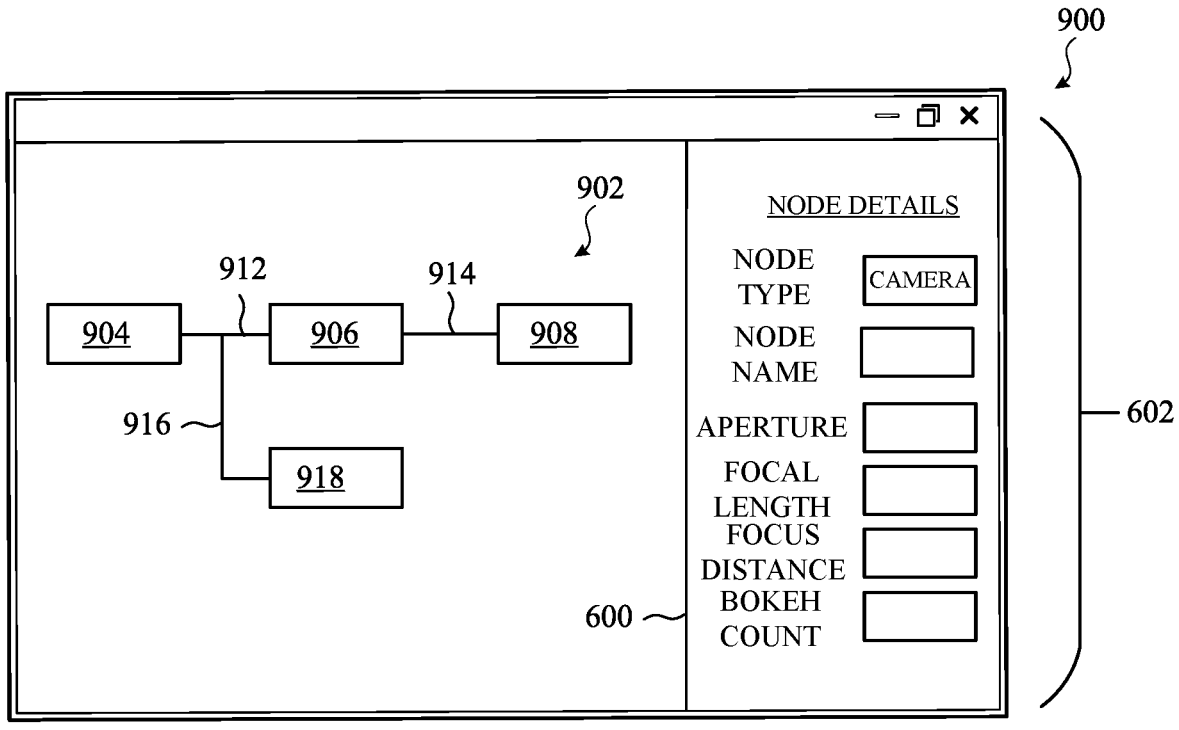
FIG. 9 illustrates an example GUI that enables interaction with the logic of a node in accordance with some embodiments.

FIG. 9 illustrates a first example GUI that enables interaction with the logic of a node in accordance with some embodiments. The GUI 900 presents a 2D node graph 902 that represents nodes 904, 906, 908, 910 and the paths 912, 914, 916 that logically connect two nodes together. Each node 904, 906, 908, 910 includes the programming instructions for that node. An editor user is able to modify, delete, or add instructions for the node 904, 906, 908, 910 using the node graph 902. For example, an editor user can select a node (e.g., node 904) in the node graph and the logic associated with that node is displayed in a panel 600 in the GUI 900 or in a separate GUI (see FIG. 10). In some embodiments, the GUI 900 also presents the settings 602 for a respective node in a panel 600. For brevity, only a portion of the settings 602 are shown in FIG. 9.

In another non-limiting example, an editor user can modify a path (e.g., path 914) by adjusting (e.g., dragging) one or both endpoints of the path to logically connect the path to one or two different nodes. An editor user may also add and/or delete a node in the node graph 902. For example, the editor user can select (e.g., click on) a node and hit "delete" or backspace to delete the node, or the editor user may select a menu option to delete a node (e.g., menu option 636 in FIG. 6). Additionally or alternatively, the editor user may select (e.g., right click on) the GUI 900 to add a node (e.g., 634 in the contextual menu 628 in FIG. 6), or the editor user may select a menu option to add a node (e.g., menu option 632 in FIG. 6).

Figure 10:
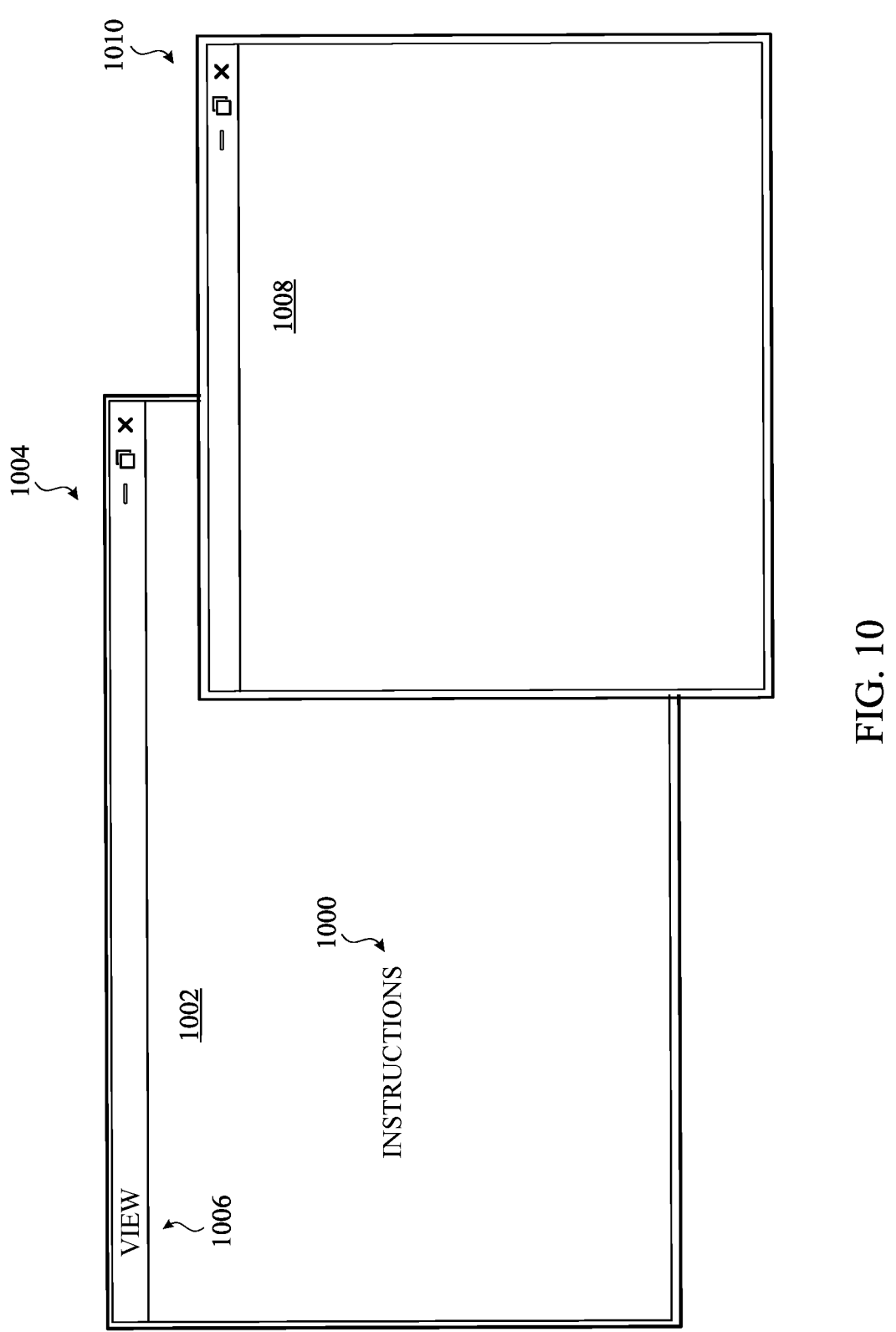
FIG. 10 illustrates an alternative example GUI that enables interaction with the logic of a node in accordance with some embodiments.

FIG. 10 illustrates a second example GUI that enables interaction with the logic of a node in accordance with some embodiments. When a node in the node graph shown in FIG. 9 is selected, the programming instructions 1000 for that node can be displayed in a panel 1002 of a GUI 1004. The editor user may add, modify, and/or delete programming instructions via the panel 1002. When all modifications have been made to the instructions 1000, the editor user selects the menu option 1006 to cause the changes to the level to be presented. In one embodiment, the changes to the level are displayed in the panel 1008 in a separate GUI 1010. In another embodiment, the editor user can launch the video game and view the changes to the level by viewing the level as it plays.

The embodiments of FIGS. 2-9 were described in conjunction with the nodes configured as camera nodes. However, nodes can be implemented as other types of nodes in addition to camera nodes. For example, in one embodiment, a node may be an effects node that, when triggered, produces different effects in a level. A visual effects node is one example of an effects node. When triggered, the visual effects node produces different visual effects in a level. The visual effects can include, but are not limited to, presenting different objects in a level, changing the color of some objects in the level, displaying animation, and changing the rate of the passage of time (e.g., slow motion, fast forward). Another example of a different type of effects node is an audio effects node that when triggered, generates different audio outputs (e.g., sounds) for the level. In some embodiments, an effects node is both a visual and an audio effects node.

Figure 11:
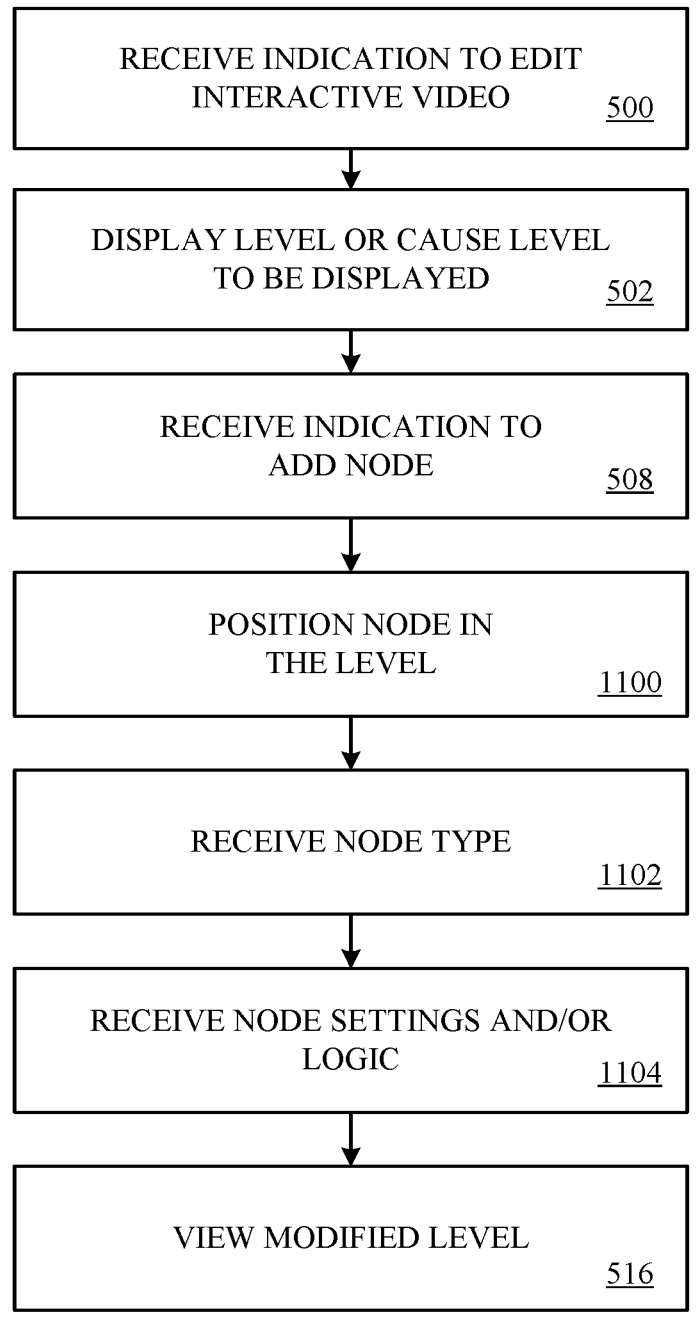
FIG. 11 illustrates a flowchart of an example method of adding an effects node in an interactive video in accordance with some embodiments.

FIG. 11 illustrates a flowchart of an example method of adding an effects node in an interactive video in accordance with some embodiments. The process is performed by an editor user to add or modify one or more effects nodes in a level of a video game. The method is described in conjunction with one effects node but can be used to add multiple effects nodes. Some of the blocks shown in FIG. 10 are also in FIG. 5. As such, these blocks will not be described in detail.

Initially, indications to edit a video game are received at block 500. The level (or level content) in the video game is displayed or caused to be displayed and an indication to add a node is received (blocks 502, 508). The node is positioned within the level at block 1100. For example, the effects node may be dragged to or otherwise placed at a desired location in the level in one embodiment.

Data that specifies the node type is received at block 1102. In this example embodiment, the data indicates the node type is a visual effects node. As noted earlier, other embodiments are not limited to this type of node. A node can be any suitable type of node, such as an audio effects node, a haptic effects node, and the like.

Next, as shown in block 1104, the settings and/or the logic for the visual effects node are received. The settings and/or logic define what visual effect will be produced, the features of the visual effect, and one or more triggering conditions for the visual effects node. The settings and/or the logic may be received through one or more GUIs, such as the GUIs shown in FIGS. 6-10. The modified level is then viewed at block 516.

In one example, if a new object is to be displayed, the settings and/or the logic can specify what the new object is and the features of the new object, such as a color or colors of the new object, where the new object is placed in the level, and any action that is performed by the new object. In one embodiment, the new object can move in one or more directions in the level.

In another example, an existing object in the level changes color and/or shape in response to triggering a visual effects node. The color and/or shape change may indicate an action that is performed by the object or an effect that a process or an action is having on the object. For example, when the object is a skillet that is placed on a stove, the color of the skilled may change to the color red to indicate the skillet is hot. In some instances, the color change occurs over time to indicate a gradual change to an object. In the skillet example, the color change of the skillet may change from light red to bright red over time to indicate the temperature of the skillet is increasing over time.

Figure 12A:
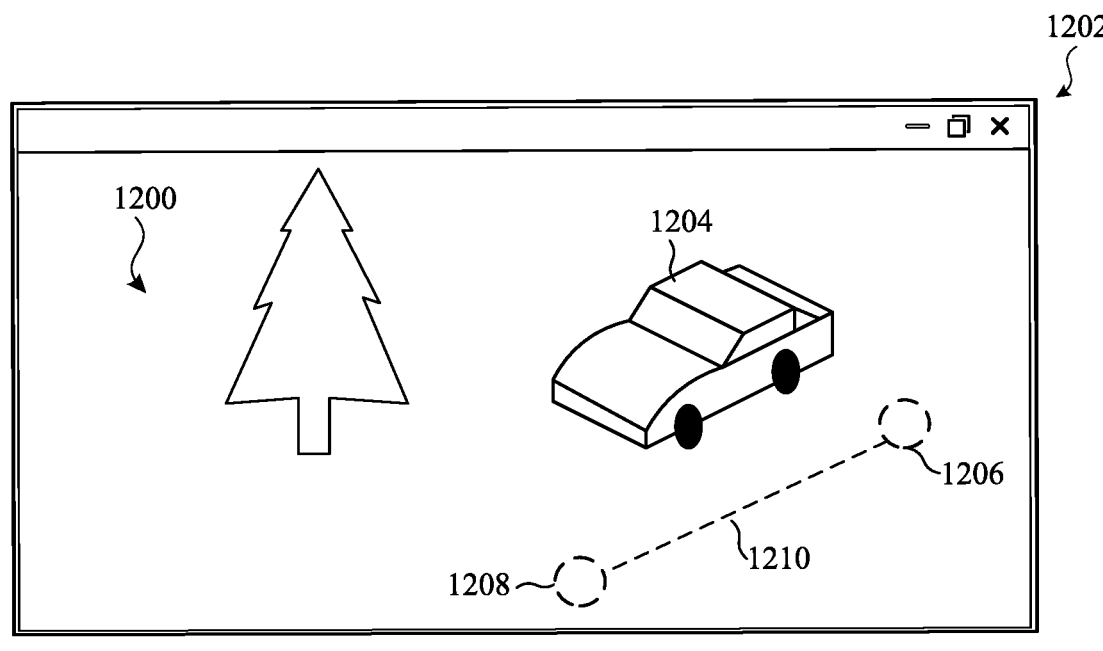
FIG. 12A illustrates an example GUI that presents a level in accordance with some embodiments.
Figure 12B:
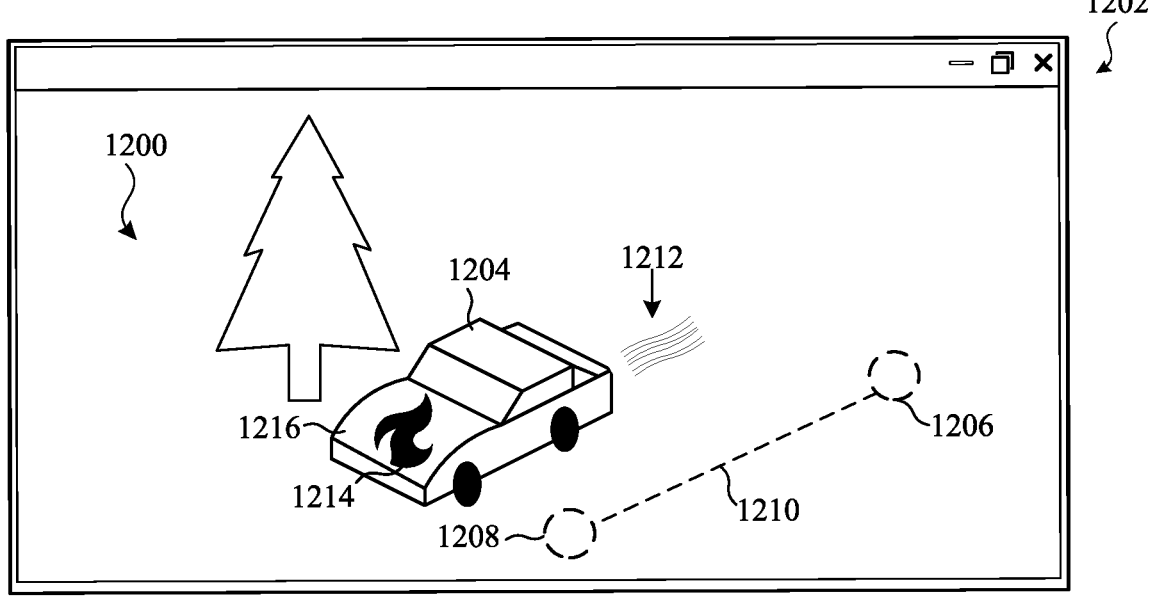
FIG. 12B illustrates the GUI presenting example visual effects in the level shown in FIG. 12A in accordance with some embodiments.

FIG. 12A illustrates an example GUI that presents a level of a video game and FIG. 12B illustrates the GUI displaying example visual effects in the level in accordance with some embodiments. The level 1200 in the GUI 1202 includes an automobile 1204 (e.g., an object), visual effects nodes 1206, 1208 positioned near the automobile 1204. A path 1210 logically connects between the visual effects nodes 1206, 1208. The visual effects nodes 1206, 1208 are represented as dashed circuits and the path 1210 is represented as a dashed line in the level 1200 because the visual effects nodes 1206,1208 and the path 1210 are not visible in the level when a player user is playing the video game. As a player user interacts with the level 1200, the player user can trigger the visual effects node 1206. For example, a distance from the visual effects node 1206 may be a triggering condition for the visual effects node 1206. While playing the video game, the player user may move within the given distance from the visual effects node 1206, which then triggers the visual effects node 1206.

As shown in FIG. 12B, triggering the visual effects node 1206 causes the level to move along the path 1210 to the visual effects node 1208. During the traversal of the path 1210, the automobile 1204 can move forward and waves of air 1212 may be presented at the back of the automobile 1204 to indicate the speed of the automobile 1204 has increased. The waves of air 1210 can be rendered as a moving shimmering region to further indicate the waves of air 1210 are warm or hot (not shown). Additionally, a fire decal 1214 may be displayed on the hood 1216 of the automobile 1204 to represent the automobile 1204 as a race car. When the path 1210 is traversed and reaches the visual effects node 1208, each visual effect can end or remain, depending on the plot of the level. For example, the waves of air 1212 may end and the fire decal 1214 can remain. Alternatively, both the waves of air 1212 and the fire decal 1214 can disappear. Those skilled in the art will recognize that different visual effects may be produced in other embodiments.

Figure 13:
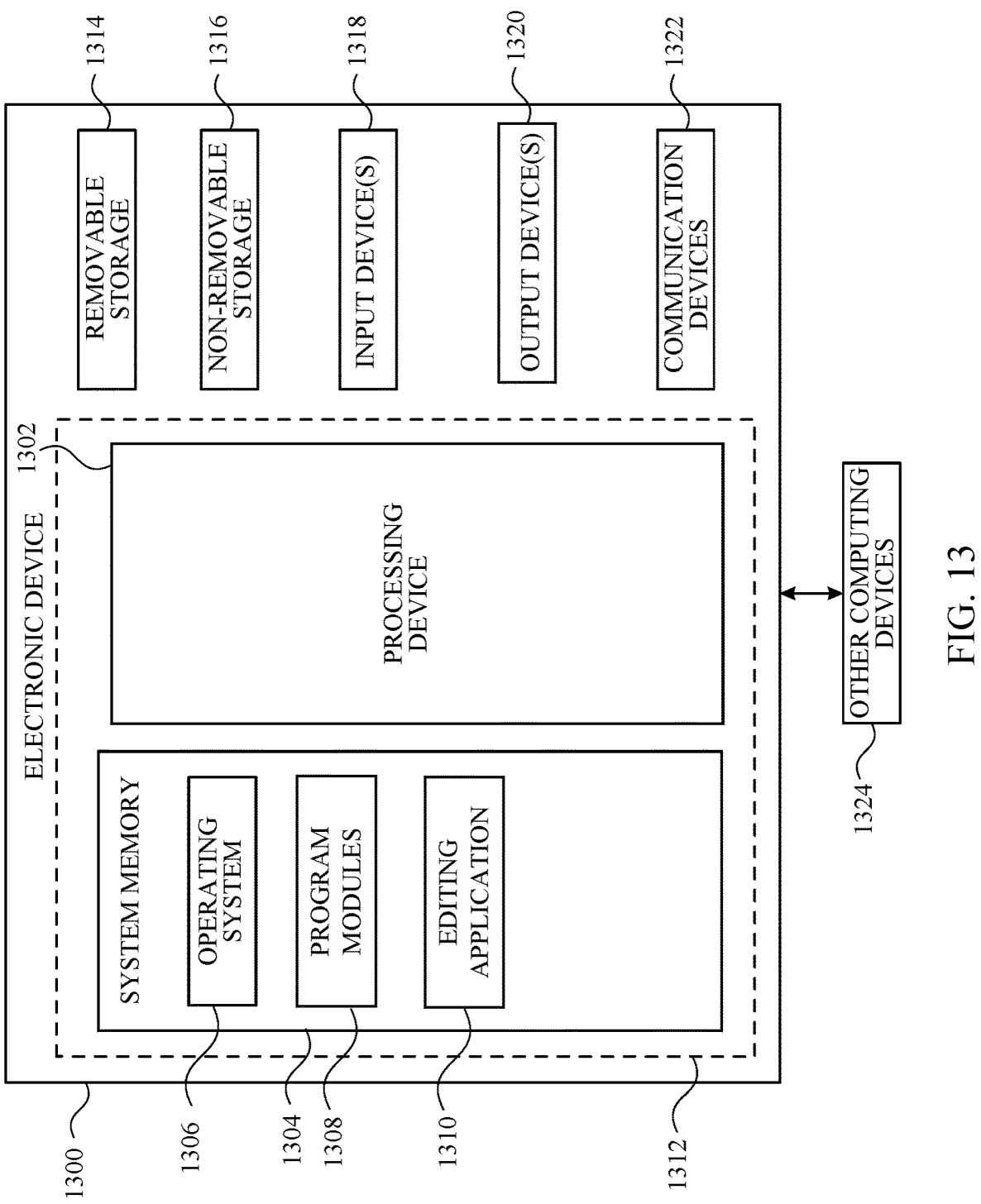
FIG. 13 illustrates a block diagram depicting example physical components of a computing device with which aspects of the disclosure may be practiced.
Figure 14A:
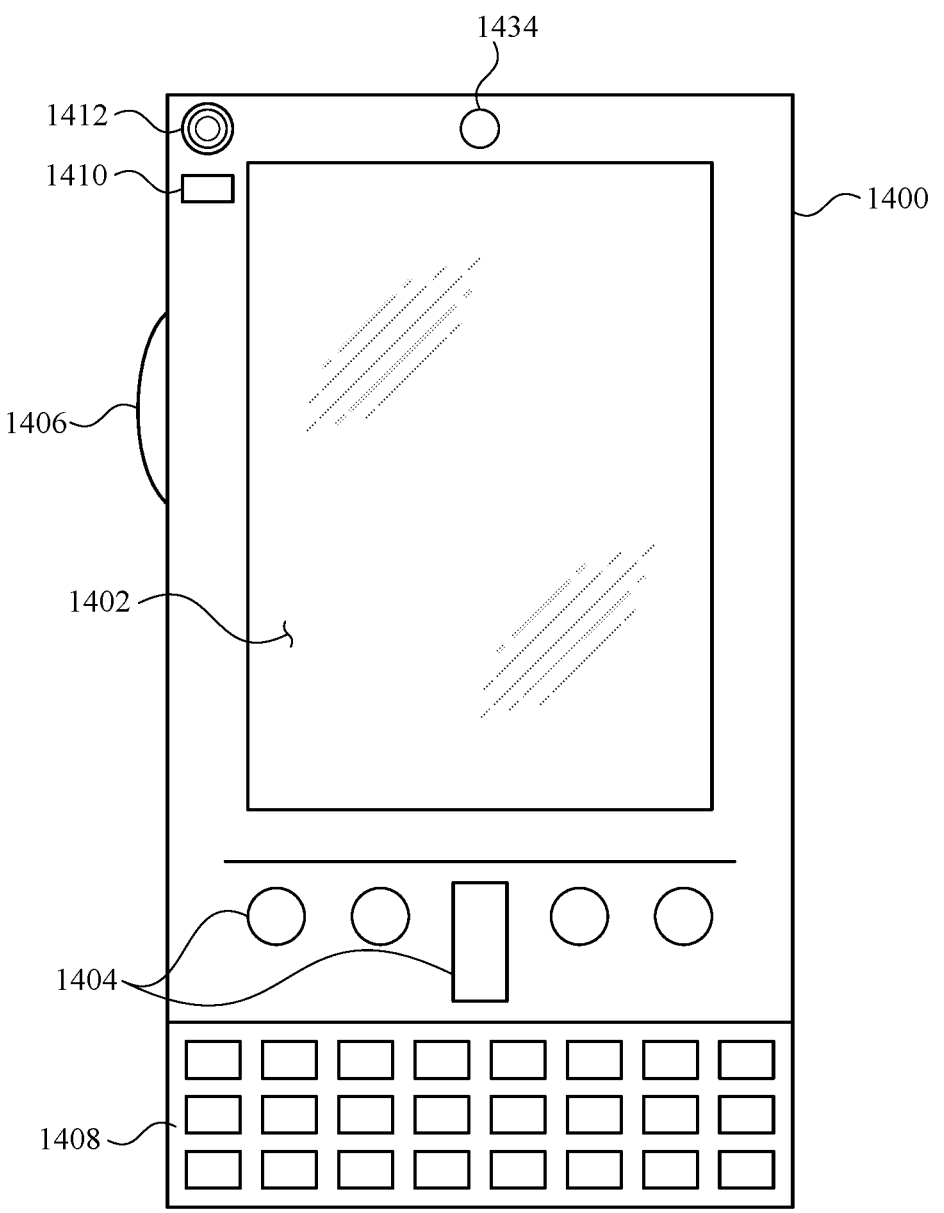
FIGS. 14A-14B illustrate block diagrams illustrating a mobile computing device with which aspects of the present disclosure may be practiced.
Figure 14B:
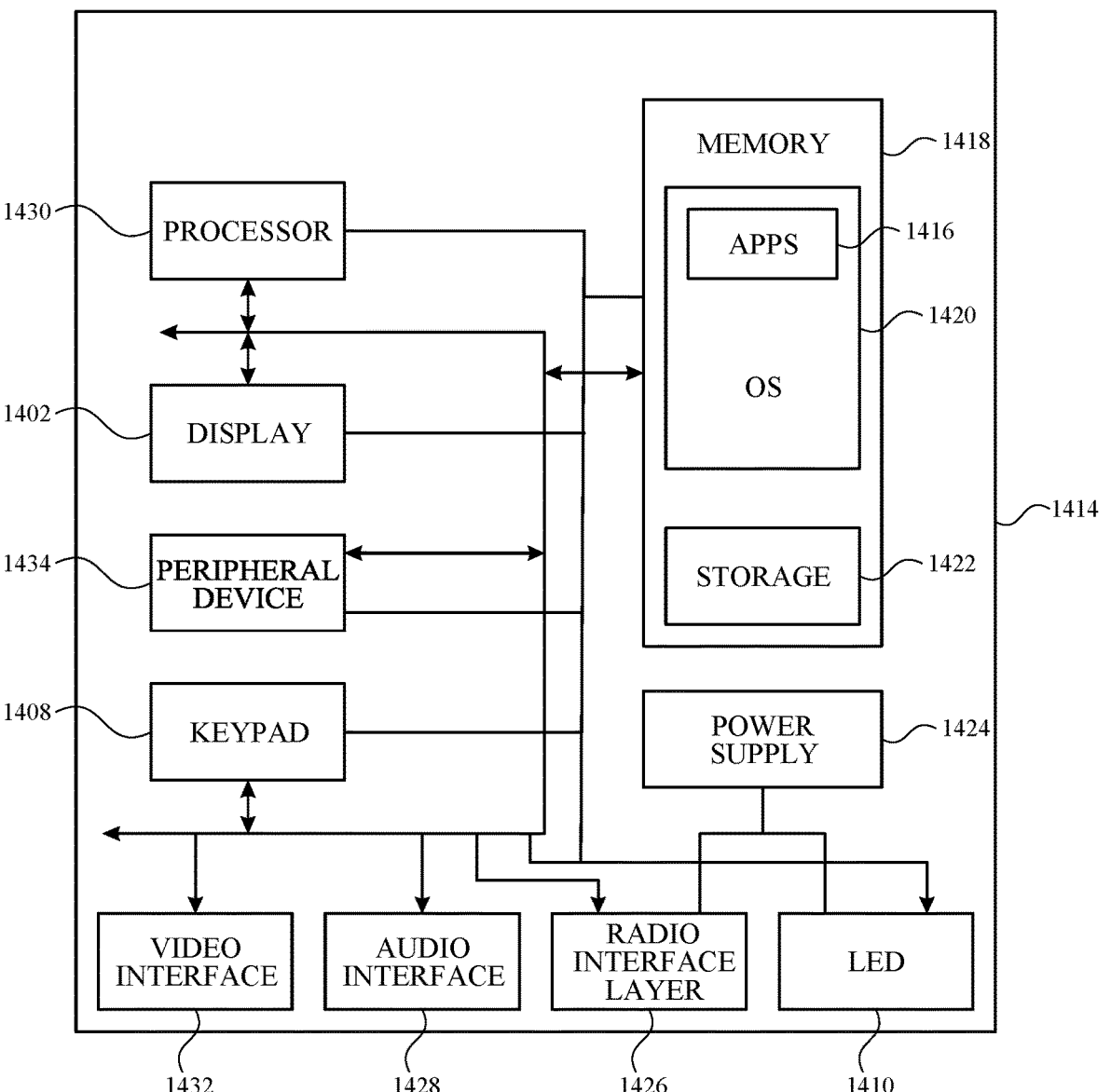
Figure 15:
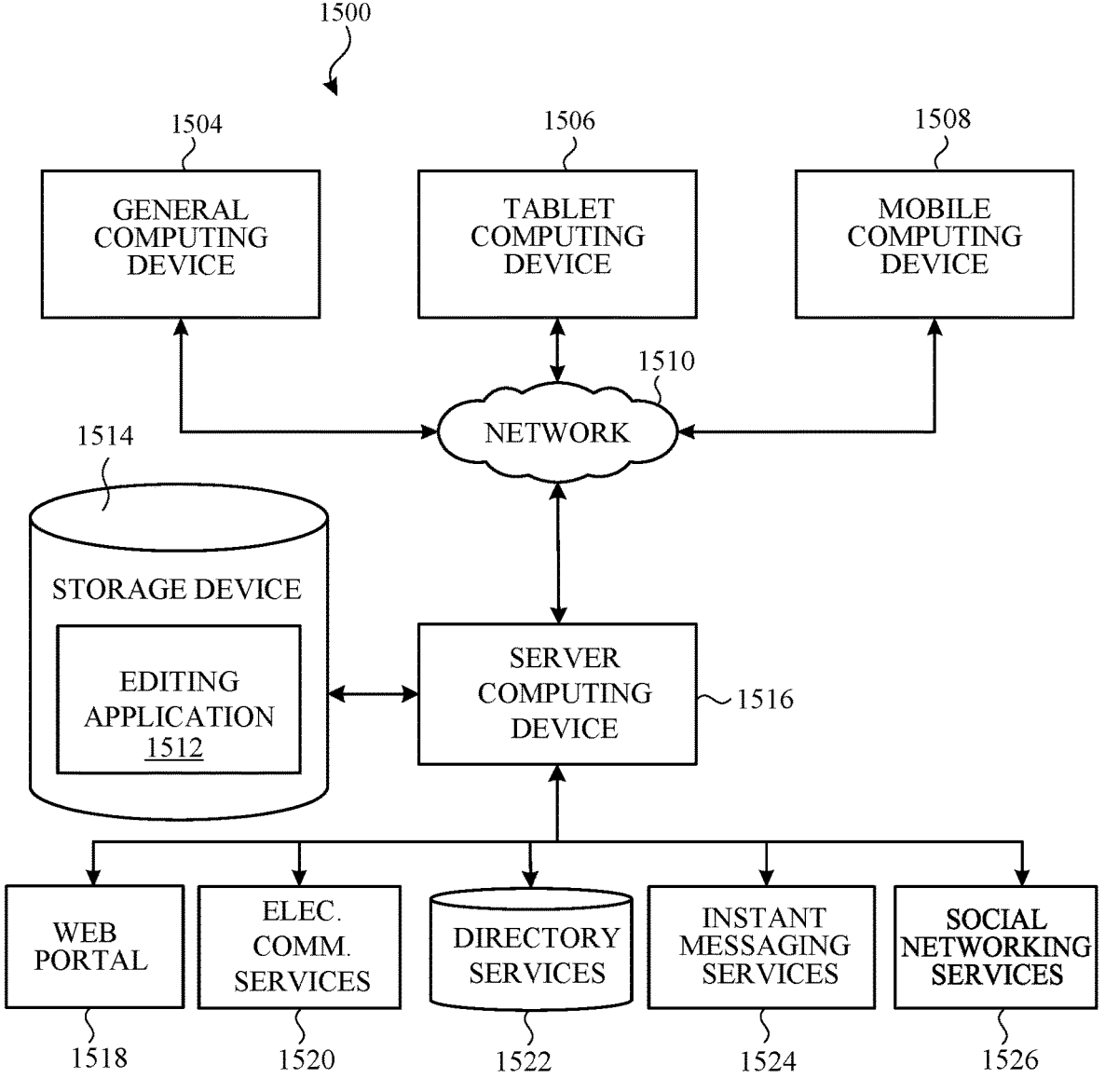
FIG. 15 illustrates a block diagram of a distributed computing system in which aspects of the present disclosure may be practiced.

FIGS. 13-15 and the associated descriptions provide a discussion of a variety of operating environments in which aspects of the disclosure may be practiced. However, the devices and systems illustrated and discussed with respect to FIGS. 13-15 are for purposes of example and illustration and are not limiting of a vast number of electronic device configurations that may be utilize for practicing aspects of the disclosure, as described herein.

FIG. 13 is a block diagram illustrating physical components (e.g., hardware) of an electronic device with which aspects of the disclosure may be practiced. In a basic configuration, the electronic device 1300 may include at least one processing device 1302 and a memory 1304. Any suitable processing device 1302 can be used. For example, the processing device 1302 may be a microprocessor, an application specific integrated circuit, a field programmable gate array, or combinations thereof.

Depending on the configuration and type of the electronic device 1300, the memory 1304 may comprise, but is not limited to, volatile storage (e.g., random access memory), non-volatile storage (e.g., read-only memory), flash memory, or any combination of such memories. The memory 1304 may include a number of program modules and data files, such as an operating system 1306, program modules 1308, and an editing software application 1310. While executing on the processing device 1302, the editing software application 1310 may perform and/or cause to be performed processes including, but not limited to, the aspects as described herein.

The operating system 1306, for example, may be suitable for controlling the operation of the electronic device 1300. Furthermore, embodiments of the disclosure may be practiced in conjunction with a graphics library, other operating systems, or any other application program and is not limited to any particular application or system. This basic configuration is illustrated in FIG. 13 by those components within a dashed line 1312.

The electronic device 1300 may have additional features or functionality. For example, the electronic device 1300 may also include additional data storage devices (removable and/or non-removable) such as, for example, magnetic disks, optical disks, or tape. Such additional storage is illustrated in FIG. 13 by a removable storage device 1314 and a non-removable storage device 1316.

The electronic device 1300 may also have one or more input device(s) 1318 such as a keyboard, a trackpad, a mouse, a pen, a sound or voice input device, a touch, force and/or swipe input device, etc. The output device(s) 1320 such as a display, speakers, a printer, etc. may also be included. The aforementioned devices are examples and others may be used. The electronic device 1300 may include one or more communication devices 1322 allowing communications with other electronic devices 1324. Examples of suitable communication devices 1322 include, but are not limited to, radio frequency (RF) transmitter, receiver, and/or transceiver circuitry; universal serial bus (USB), parallel, and/or serial ports.

The term computer-readable media as used herein may include storage media or devices. The storage media or devices may include volatile and nonvolatile, removable and non-removable media implemented in any method or technology for storage of information, such as computer readable instructions, data structures, or program modules.

The memory 1304, the removable storage device 1314, and the non-removable storage device 1316 are all examples of storage devices. Each storage device may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1300. Any such storage device may be part of the electronic device 1300. In one embodiment, the storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality described herein, with respect to the capability of client to switch protocols may be operated via application-specific logic integrated with other components of the electronic device 1300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

FIGS. 14A-14B illustrate a mobile electronic device 1400, for example, a mobile telephone, a smart phone, wearable computer (such as a smart watch), a tablet computer, a laptop computer, and the like, with which embodiments of the disclosure may be practiced. With reference to FIG. 14A, one aspect of a mobile electronic device 1400 for implementing the aspects described herein is illustrated.

In a basic configuration, the mobile electronic device 1400 is a handheld computer having both input elements and output elements. The mobile electronic device 1400 typically includes a display 1402 and one or more input buttons 1404 that allow the user to enter information into the mobile electronic device 1400. The display 1402 of the mobile electronic device 1400 may also function as an input device (e.g., a display that accepts touch and/or force input).

If included, an optional side input element 1406 allows further user input. The side input element 1406 may be a rotary switch, a button, or any other type of manual input element. In alternative aspects, mobile electronic device 1400 may incorporate more or less input elements. For example, the display 1402 may not be a touch screen in some embodiments. In yet another alternative embodiment, the mobile electronic device 1400 is a portable phone system, such as a cellular phone. The mobile electronic device 1400 may also include an optional keypad 1408. Optional keypad 1408 may be a physical keypad or a "soft" keypad generated on the touch screen display.

In various embodiments, the output elements include the display 1402 for showing a graphical user interface (GUI) of a client or developer portal, a visual indicator 1410 (e.g., a light emitting diode), and/or an audio transducer 1412 (e.g., a speaker). In some aspects, the mobile electronic device 1400 incorporates a vibration transducer for providing the user with tactile feedback. In yet another aspect, the mobile electronic device 1400 incorporates input and/or output ports, such as an audio input (e.g., a microphone jack), an audio output (e.g., a headphone jack), and a video output (e.g., a HDMI port) for sending signals to or receiving signals from an external device.

FIG. 14B is a block diagram illustrating the architecture of one aspect of a mobile electronic device 1400. That is, the mobile electronic device 1400 can incorporate a system (e.g., an architecture) 1414 to implement some aspects. In one embodiment, the system 1414 is implemented as a "smart phone" capable of running one or more applications (e.g., browser, e-mail, calendaring, contact managers, messaging clients, games, media clients/players, diagramming, and sharing applications and so on). In some aspects, the system 1414 is integrated as an electronic device, such as an integrated personal digital assistant (PDA) and wireless phone.

One or more application programs 1416 may be loaded into the memory 1418 and run on or in association with the operating system 1420. Examples of the application programs include a phone dialer program, an electronic communication program (e.g., electronic mail program, instant message program), a triggering application program, a word processing program, a spreadsheet program, an Internet browser program, and so forth.

The system 1414 also includes a non-volatile storage area 1422 within the memory 1418. The non-volatile storage area 1422 may be used to store persistent information that should not be lost when the system 1414 is powered down.

The application programs 1416 may use and store information in the non-volatile storage area 1422, such as email, attachments or other messages used by an email application, and the like. A synchronization application (not shown) also resides on the system 1414 and is programmed to interact with a corresponding synchronization application resident on a host computer to keep the information stored in the non-volatile storage area 1422 synchronized with corresponding information stored at the host computer.

The system 1414 has a power supply 1424, which may be implemented as one or more batteries. The power supply 1424 may further include an external power source, such as an AC adapter or a powered docking cradle that supplements or recharges the batteries.

The system 1414 may also include a radio interface layer 1426 that performs the function of transmitting and receiving radio frequency communications. The radio interface layer 1426 facilitates wireless connectivity between the system 1414 and the "outside world," via a communications carrier or service provider. Transmissions to and from the radio interface layer 1426 are conducted under control of the operating system 1420. In other words, communications received by the radio interface layer 1426 may be disseminated to the application programs 1416 via the operating system 1420, and vice versa.

The visual indicator 1410 may be used to provide visual notifications, and/or an audio interface 1428 may be used for producing audible notifications via an audio transducer (e.g., audio transducer 1412 illustrated in FIG. 14A). In the illustrated embodiment, the visual indicator 1410 is a light emitting diode (LED) and the audio transducer 1412 may be a speaker. These devices may be directly coupled to the power supply 1424 so that when activated, they remain on for a duration dictated by the notification mechanism even though the processor 1430 and other components might shut down for conserving battery power. The LED may be programmed to remain on indefinitely until the user takes action to indicate the powered-on status of the device.

The audio interface 1428 is used to provide audible signals to and receive audible signals from the user (e.g., voice input such as described above). For example, in addition to being coupled to the audio transducer 1412, the audio interface 1428 may also be coupled to a microphone to receive audible input, such as to facilitate a telephone conversation.

The system 1414 may further include a video interface 1432 that enables an operation of peripheral device 1434 (e.g., on-board camera) to record still images, video stream, and the like.

A mobile electronic device 1400 implementing the system 1414 may have additional features or functionality. For example, the mobile electronic device 1400 may also include additional data storage devices (removable and/or non-removable) such as, magnetic disks, optical disks, or tape. Such additional storage is illustrated in FIG. 14B by the non-volatile storage area 1422.

Data/information generated or captured by the mobile electronic device 1400 and stored via the system 1414 may be stored locally on the mobile electronic device 1400, as described above, or the data may be stored on any number of storage media that may be accessed by the device via the radio interface layer 1426 or via a wired connection between the mobile electronic device 1400 and a separate electronic device associated with the mobile electronic device 1400, for example, a server-computing device in a distributed computing network, such as the Internet (e.g., server computing device 1516 in FIG. 15). As should be appreciated such data/information may be accessed via the mobile electronic device 1400 via the radio interface layer 1426 or via a distributed computing network. Similarly, such data/information may be readily transferred between electronic devices for storage and use according to well-known data/information transfer and storage means, including electronic mail and collaborative data/information sharing systems.

As should be appreciated, FIG. 14A and FIG. 14B are described for purposes of illustrating the present methods and systems and is not intended to limit the disclosure to a particular sequence of steps or a particular combination of hardware or software components.

FIG. 15 illustrates a block diagram of a distributed system in which aspects of the disclosure may be practiced. The system includes a general computing device 1504 (e.g., a desktop computer), a tablet computing device 1506, and/or a mobile computing device 1508. The general computing device 1504, the tablet computing device 1506, and the mobile computing device 1508 can each include the components, or be connected to the components, that are shown associated with the electronic device 1300 in FIG. 13 or the mobile electronic device 1400 in FIGS. 14A-14B.

The general computing device 1504, the tablet computing device 1506, and the mobile computing device 1508 are each configured to access one or more networks (represented by network 1510) to interact with the editing application 1512 stored in one or more storage devices (represented by storage device 1514) and executed on one or more server computing devices (represented by server computing device 1516). In some aspects, the server computing device 1516 can access and/or receive various types of services, communications, documents and information transmitted from other sources, such as a web portal 1518, an electronic communications services 1520, directory services 1522, instant messaging and/or text services 1524, and/or social networking services 1526. In some instances, these sources may provide robust reporting, analytics, data compilation and/or storage service, etc., whereas other services may provide search engines or other access to data and information, images, graphics, videos, document processing and the like.

As should be appreciated, FIG. 15 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, GUIs, and computer program products according to aspects of the disclosure. As discussed earlier, the operations noted in the blocks may occur out of the order as shown in any flowchart. For example, two blocks shown in succession may in fact be executed substantially concurrently or the blocks may sometimes be executed in the reverse order, depending upon the functionality/acts involved. Additionally, the functionality or elements shown in one GUI can be used in another GUI, and vice versa.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternative aspects falling within the spirit of the broader aspects of the general inventive concept embodied in this application that do not depart from the broader scope of the claimed disclosure.

What is claimed is:

1. A method, comprising:

receiving an indication to edit an interactive video, the interactive video including content;

causing a three-dimensional (3D) view of the interactive video to be displayed, the 3D view displaying a plurality of nodes in the interactive video, wherein the plurality of nodes includes at least an effects node;

receiving a selection of the effects node; causing information associated with the effects node to be displayed; and receiving an edit to the information to produce an edited effects node, the edited effects node changing at least one visual effect or audio effect generated in the content of the interactive video when the interactive video is viewed, wherein the visual effect alters at least one property of an object in the interactive video when viewed from another node of the plurality of nodes and wherein the at least one property of the object includes an animation of the object.

2. The method of claim 1, further comprising causing the interactive video to be displayed after the edited effects node is produced.

3. The method of claim 1, wherein causing the information associated with the effects node to be displayed comprises causing a setting of the effects node to be displayed.

4. The method of claim 3, wherein receiving the edit to the information to produce the edited effects node comprises receiving an edit to the setting to produce an edited interactive video.

5. The method of claim 1, wherein causing the information associated with the effects node to be displayed comprises causing a node graph to be displayed.

6. The method of claim 1, further comprising: receiving an indication to add a node; or receiving an indication to delete the effects node.

7. The method of claim 1, wherein receiving the indication to edit the interactive video comprises at least one of: launching an editing software application; or causing the editing software application to enter an edit mode.

8. The method of claim 1, wherein the at least one property of the object includes a color of the object.

9. A system, comprising: a processing device; and a storage device operably connected to the processing device and storing instructions, that when executed by the processing device, cause operations to be performed, the operations comprising:

receiving an indication to edit an interactive video, the interactive video including content;

causing a three-dimensional (3D) view of the interactive video to be displayed in a first graphical user interface (GUI), the 3D view displaying a plurality of nodes including at least an effects node, and a path logically connected to the effects node;

receiving, via the first GUI, a selection of the effects node; causing information associated with the effects node to be displayed in the first GUI or in a separate second GUI; and receiving, via the first GUI or the second GUI, an edit to the information to produce an edited effects node, the edited effects node being a visual effects node and changing at least one property of an object of the interactive video when the interactive video is generated and when viewed from another node of the plurality of nodes and wherein the at least one property of the object includes an animation of the object.

10. The system of claim 9, wherein the storage device stores further instructions for causing the interactive video to be presented on a display after the edited effects node is produced.

11. The system of claim 9, wherein: the effects node is a first effects node;

the 3D view further includes a second effects node of the plurality of nodes and a graphical element associated with the path; the path logically connects between the first and the second effects nodes and represents a transition between the first and the second effects nodes; and the storage device stores further instructions for: receiving, via the first GUI, a selection of the graphical element; receiving, via the first GUI, an indication to edit the path associated with the graphical element; causing information associated with the path to be displayed in the first GUI or in a separate third GUI; and receiving, via the first GUI or the third GUI, an edit to the information to produce an edited path, the edited path modifying the transition between the first and the second effects nodes to alter which content in the interactive video is generated during the transition.

12. The system of claim 11, wherein the path is implemented as a spline.

13. The system of claim 9, wherein causing the information associated with the node to be displayed comprises causing a node graph to be displayed.

14. The system of claim 9, wherein causing the information associated with the effects node to be displayed comprises causing programming instructions associated with the effects node to be displayed.

15. The system of claim 9, wherein causing the information associated with the effects node to be displayed comprises causing a setting of the effects node to be displayed.

16. A method, comprising:

receiving an indication to edit an interactive video;

causing a three-dimensional (3D) view of the interactive video to be displayed in a first graphical user interface (GUI), the 3D view displaying a plurality of nodes including at least a first effects node and a second effects node wherein at least one of the first effects node and the second effects node is a visual effects node, a path between the first and the second effects nodes that represents an effects transition between the first and the second effects nodes, and a graphical element that is associated with the path;

receiving, via the first GUI, a selection of the graphical element;

causing information associated with the path to be displayed in the first GUI or in a separate second GUI; and receiving, via the first GUI or the second GUI, an edit to the information to produce an edited path, the edited path modifying the camera transition between the first and the second effects nodes to alter at least one property of an object of the interactive video generated during the camera transition when viewed from another node of the plurality of nodes and wherein the at least one property of the object includes an animation of the object.

17. The method of claim 16, further comprising causing the interactive video to be displayed after the edited path is produced.

18. The method of claim 16, further comprising: receiving, via the first GUI, a selection of the first effects node; causing information associated with the first effects node to be displayed in the first GUI or in a separate third GUI; and receiving, via the first GUI or the third GUI, an edit to the information to produce an edited first effects node.

19. The method of claim 16, further comprising: receiving a selection of the second effects node; causing information associated with the second effects node to be displayed in the first GUI or in a separate third GUI; and receiving, via the first GUI or the third GUI, an edit to the information to produce an edited second effects node.

* * * * *